US006086623A

United States Patent [19]
Broome et al.

[11] Patent Number: 6,086,623
[45] Date of Patent: Jul. 11, 2000

[54] METHOD AND IMPLEMENTATION FOR INTERCEPTING AND PROCESSING SYSTEM CALLS IN PROGRAMMED DIGITAL COMPUTER TO EMULATE RETROGRADE OPERATING SYSTEM

[75] Inventors: Jonathan Broome, Long Beach; David Marx, Los Angeles, both of Calif.

[73] Assignee: Sun Microsystems, Inc., Palo Alto, Calif.

[21] Appl. No.: 08/885,973

[22] Filed: Jun. 30, 1997

[51] Int. Cl.[7] .................................................. G06F 9/455
[52] U.S. Cl. ............................. 703/26; 703/27; 712/226
[58] Field of Search .................... 395/500.44, 500.47, 395/500.48, 406, 375; 364/578; 712/227

[56] References Cited

U.S. PATENT DOCUMENTS

| 5,481,684 | 1/1996 | Richter et al. | 395/375 |
| 5,784,615 | 7/1998 | Lipe et al. | 709/301 |
| 5,832,299 | 11/1998 | Wooten et al. | 712/229 |
| 5,948,097 | 9/1999 | Glew et al. | 712/220 |

OTHER PUBLICATIONS

Intel Corporation, "80386 System Software Writer's Guide", Intel Corp. Liturature Sales, Chapters 4 and 8, 1987.
Levitt Jason; "Solaris on Intel: A Sense of Déjà vu: Intel Version of the OS Will Seem Very Familiar to Solaris–ON–SPARC Users", Open Systems Today, May 29, 1993, p. 1.

*Primary Examiner*—Kevin J. Teska
*Assistant Examiner*—Douglas W. Sergent
*Attorney, Agent, or Firm*—Arter & Hadden LLP; David G. Alexander

[57] ABSTRACT

A current operating system such as Solaris® X86 is adapted to run a user program such as a Common Object File Format (COFF) executable program which was designed to run on a retrograde operating system such as an older version of UNIX®. The operating system is adapted to include an emulator module or COFF interpreter which emulates retrograde system calls that are unique to the COFF system. A Local Descriptor Table (LDT) which is constructed for the COFF program includes a main system call gate and an alternate system call gate that initially both point to a system call entry point in the operating system kernel. Prior to running a COFF program, the main system call gate is revectored to point to the COFF interpreter, such that all system calls generated by the COFF program are directed to the COFF interpreter. The COFF interpreter redirects current system calls which are compatible with the current operating system to the kernel via the alternate call gate. Preferably, current system calls in a dynamic library are changed to point to the alternate call gate to minimize changes to the COFF interpreter.

26 Claims, 5 Drawing Sheets

METHOD AND IMPLEMENTATION FOR INTERCEPTING AND PROCESSING SYSTEM CALLS IN PROGRAMMED DIGITAL COMPUTER TO EMULATE RETROGRADE OPERATING SYSTEM

BACKGROUND OF THE INVENTION

1. Field of the Invention

The present invention generally relates to the art of electronic digital computers, and more specifically to a method and implementation for intercepting and processing system calls to emulate a retrograde operating system.

2. Description of the Related Art

Operating systems for electronic digital computers are constantly improving and evolving. The UNIX® operating system, for example, has gone through a number of transformations, and is currently exists in a number of older and newer versions. The Solaris® X86 2.X operating system, a product of Sun Microsystems of Mountain View, Calif., evolved from the UNIX system.

The Common Object File Format (COFF) is an older type of executable binary program which runs on older versions of UNIX, including those from Interactive Systems Corporation (ISC) of Santa Monica, Calif., and Santa Cruz Operations (SCO) of Santa Cruz, Calif. Although the kernel of the Solaris operating system generally understands the COFF format, numerous incompatibilities have emerged including changes in system calls, arguments given to system calls, changes in signal numbers, changes in filenames, changes in the formats of files, etc. There are also incompatibilities between ISC and SCO COFF binaries.

It is desirable for a current operating system such as Solaris® X86 to be able to run retrograde user programs such as COFF binaries without modification to the programs. However, this has not been heretofore possible due to incompatibilities including those presented above.

SUMMARY OF THE INVENTION

The present invention overcomes the drawbacks of the prior art and enables a current operating system such as Solaris to run application programs which were designed to run in the environment of a retrograde operating system such as an older version of UNIX without modification to the programs.

This is accomplished in accordance with the present invention by adapting the current operating system to include an emulator module or COFF interpreter which emulates retrograde system calls that are unique to the COFF system. A Local Descriptor Table (LDT) which is constructed for the COFF program includes a main system call gate and an alternate system call gate which initially both point to a system call entry point in the operating system kernel.

Prior to running a COFF program, the main system call gate is revectored to point to the COFF interpreter, such that all system calls generated by the COFF program are directed to the COFF interpreter. The COFF interpreter redirects current system calls which are compatible with the current operating system to the kernel via the alternate system call gate. Preferably, current system calls in a dynamic library are changed to point to the alternate call gate to simplify the implementation of the COFF interpreter.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
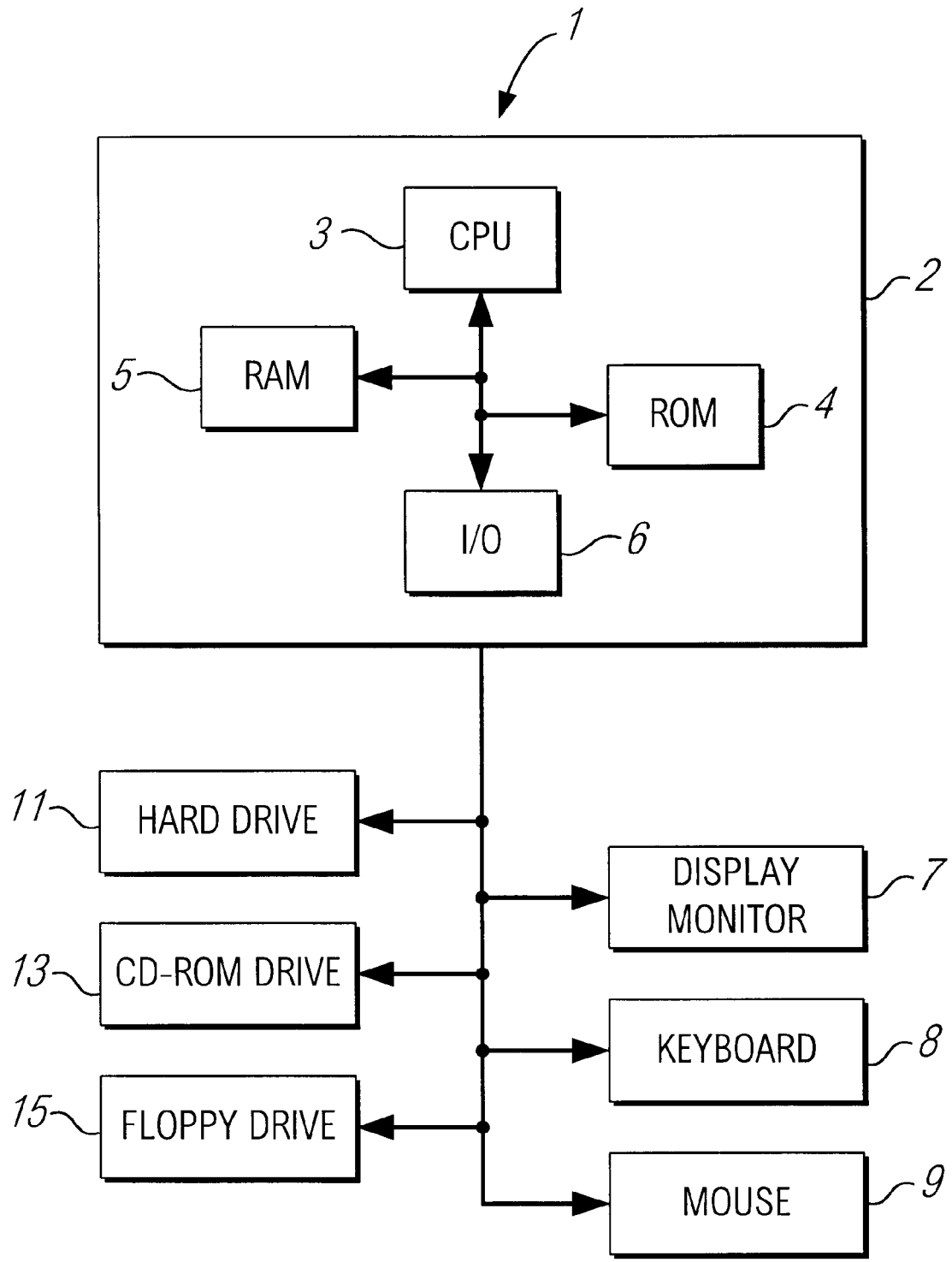
FIG. 1 is block diagram of an electronic digital computer which is programmed with an operating system according to the present invention.

FIG. 1 illustrates an electronic digital computer 1 which is programmed with an operating system according to the present invention as will be described in detail below. The computer 1 includes a motherboard 2 which is provided with with conventional elements of an electronic digital computer, including a central processing unit (CPU) 3, a non-volatile (ROM) electronic memory 4, a volatile (RAM) electronic memory 5, and an input/output interface (I/O) 6. The computer 1 also includes a video display monitor 7, a keyboard 8 and mouse 9 for data entry, a hard drive 11, a CD-ROM drive 13, and a floppy disk drive 15. These elements are operatively interconnected in a conventional manner.

Figure 2:
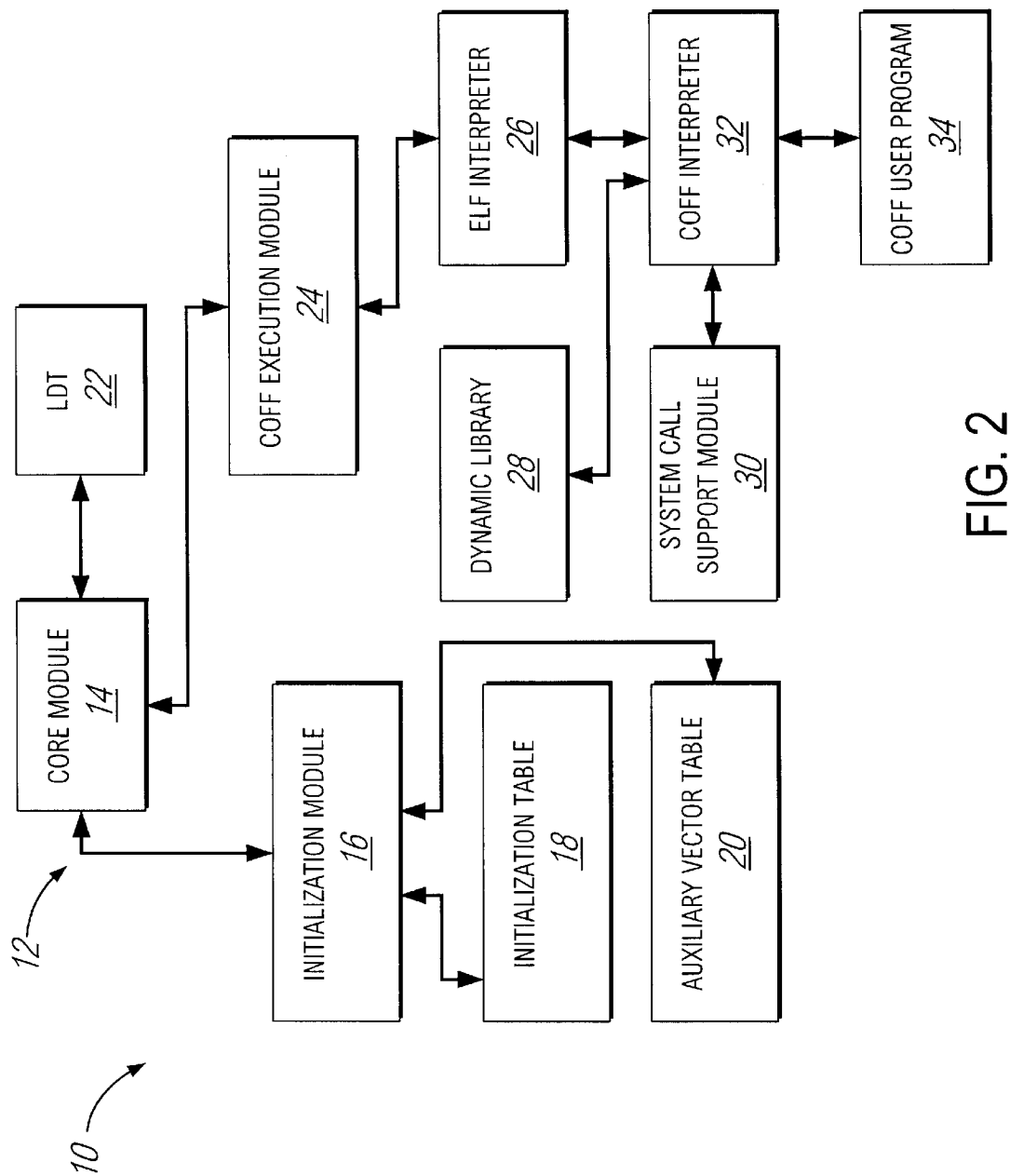
FIG. 2 is a block diagram illustrating an operating system for an electronic digital computer in accordance with the present invention.

FIG. 2 illustrates an operating system 10 which is loaded into and run in the computer 1 according to the present invention. The operating system 10 normally resides in the RAM 5, but portions of the operating system can alternatively reside in other electronic storage media of the computer 1 such as the hard drive 11.

The system 10 is preferably an adapted version of the Solaris® X86 2.X operating system, although the invention is not so limited. The system 10 can be any operating system on which it is desired to run a retrograde user program, or a program which was designed to run on an older or different operating system. The term "retrograde" as used herein is construed to refer to any program which is at least partially incompatible with a "current" operating system on which it is desired to be run, even if the current operating system is contemporary with or older than the user program.

In a preferred embodiment of the present invention, the retrograde program which is desired to the run on the system 10 is in the COFF binary executable format. Further description will be limited to running a retrograde COFF program on a current Solaris® X86 operating system which is adapted in accordance with the present invention to run the COFF program without modification thereto. However, it will be understood that this preferred implementation is exemplary only, and that the scope of the invention covers any combination of operating system and user program having applicable architecture.

The preferred implementation described below utilizes Intel (of Santa Clara, Calif.) compatible hardware. The long call instruction, selectors, index, table indicator (TI), Requestor's Privilege Level (RPL), descriptors, call gates, Local Descriptor Table (LDT), Global Descriptor Table (GDT) and privilege levels 0 to 3 are Intel specific. COFF is an executable program that runs on Intel hardware. Solaris® X86 is a Sun Microsystems product that runs on Intel hardware. Intel compatible hardware which is also suitable for practicing the present invention is commercially available from, for example, CYRIX of Richardson, Tex. and Advanced Micro Devices (AMD) of Sunnyvale, Calif.

The operating system 10 includes a main module or "kernel" 12 which is illustrated as including a core module 14 that includes program code for handling or processing system calls. All additional operating system functionality which is not the subject matter of the invention will be assumed to be implemented by the core module 14, and will not be described herein. Although not explicitly illustrated, it will be understood that all elements of the system 10 are functionally connected to the core module 14.

The kernel 12 further includes an initialization module 16 which constructs an initialization table 18 and an auxiliary vector table 20 for each process which is to be executed on the computer. The system 10 further constructs a Local Descriptor Table (LDT) 22 for each process. Additional elements of the system 10 include a COFF execution module 24, an Executable and Linking Format (ELF) interpreter 26, at least one dynamic library (e.g. dynamically loaded C library "libc" in the Solaris operating system) 28, and a system call support module 30.

In accordance with the present invention, the system 10 is adapted to further include an emulator module, in this case a COFF interpreter 32, which is configured to interpret the system calls of a COFF user program 34 and thereby emulate a retrograde operating system (older version of UNIX) on which the COFF program was designed to run.

As described above, the retrograde COFF program 34 includes a number of system calls and other functions which are incompatible with the current Solaris operating system 10 without the adaptation of the present invention. More specifically, the COFF program 34 is capable of generating current system calls which are compatible with the core module 14 in the kernel 12 of the operating system 10, and retrograde system calls which are not understood by or are otherwise incompatible with the core module 14.

Figure 3:
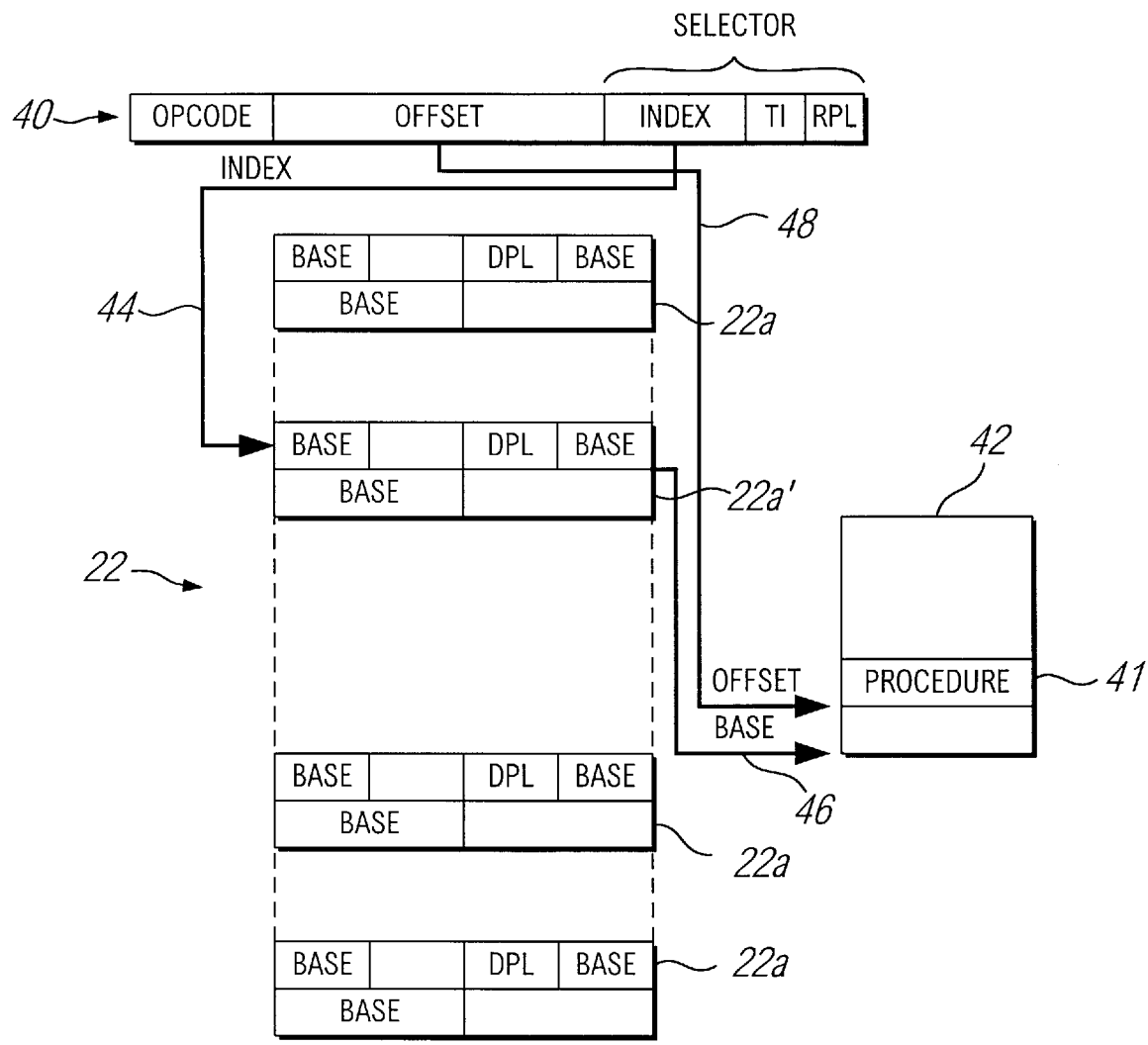
FIG. 3 is a diagram illustrating how a long call instruction is normally processed by the processor using a Local Descriptor Table (LDT) containing segment descriptors.

Prior to describing the detailed implementation of the present operating system 10, the concept of a call gate which is an important element of the invention will be presented with reference to FIGS. 2 and 3.

FIG. 3 illustrates how a normal long call instruction is handled by the Solaris or other UNIX based operating system in protected mode. A long call instruction 40 includes an operation code (OPCODE) which designates the operation or procedure which is to be performed, and an address consisting of an offset and a segment selector. These two latter elements designate the starting address of a procedure 41 in memory.

The selector includes an index into a descriptor table, a table indicator (TI) which specifies the LDT 22 or alternatively a Global Descriptor Table (GDT) which is not shown, and a Requestor's Privilege Level (RPL). The LDT 22 includes a plurality of segment descriptors 22a which contain the base addresses (BASE) of respective program segments in memory. The segment descriptors 22a also include a Descriptor Privilege Level (DPL).

As illustrated in FIG. 3, the procedure 41 which is illustrated as being located in a memory segment 42 is accessed via the index and offset of the instruction 40. The index specifies a segment descriptor 22a' in the LDT 22 which corresponds to the memory segment 42 which contains the desired procedure 41 as indicated at 44. The base address of the segment 42 is stored in the segment descriptor 22a' as indicated at 46. The offset of the instruction 40 specifies the starting address of the procedure 41 in the segment 42 as an offset from the base address as indicated at 48.

The privilege levels are part of a protection scheme which prevents user programs from performing actions that could compromise the integrity of the operating system 10. For example, if a user program overwrote code in the system area of the kernel 12, the system 10 could become erratic or crash completely. Another situation to be avoided is for a program to branch to an incorrect location in the system area.

In the Solaris® X86 operating system there are four privilege levels, numbered from 0 to 3, with the privilege decreasing with the numerical value of the privilege level. System functions generally have the highest privilege level 0, whereas user or application programs have the lowest privilege level 3. If the RPL of an instruction is numerically higher than the DPL of a segment descriptor, the program will not be allowed to access the segment.

Figure 4:
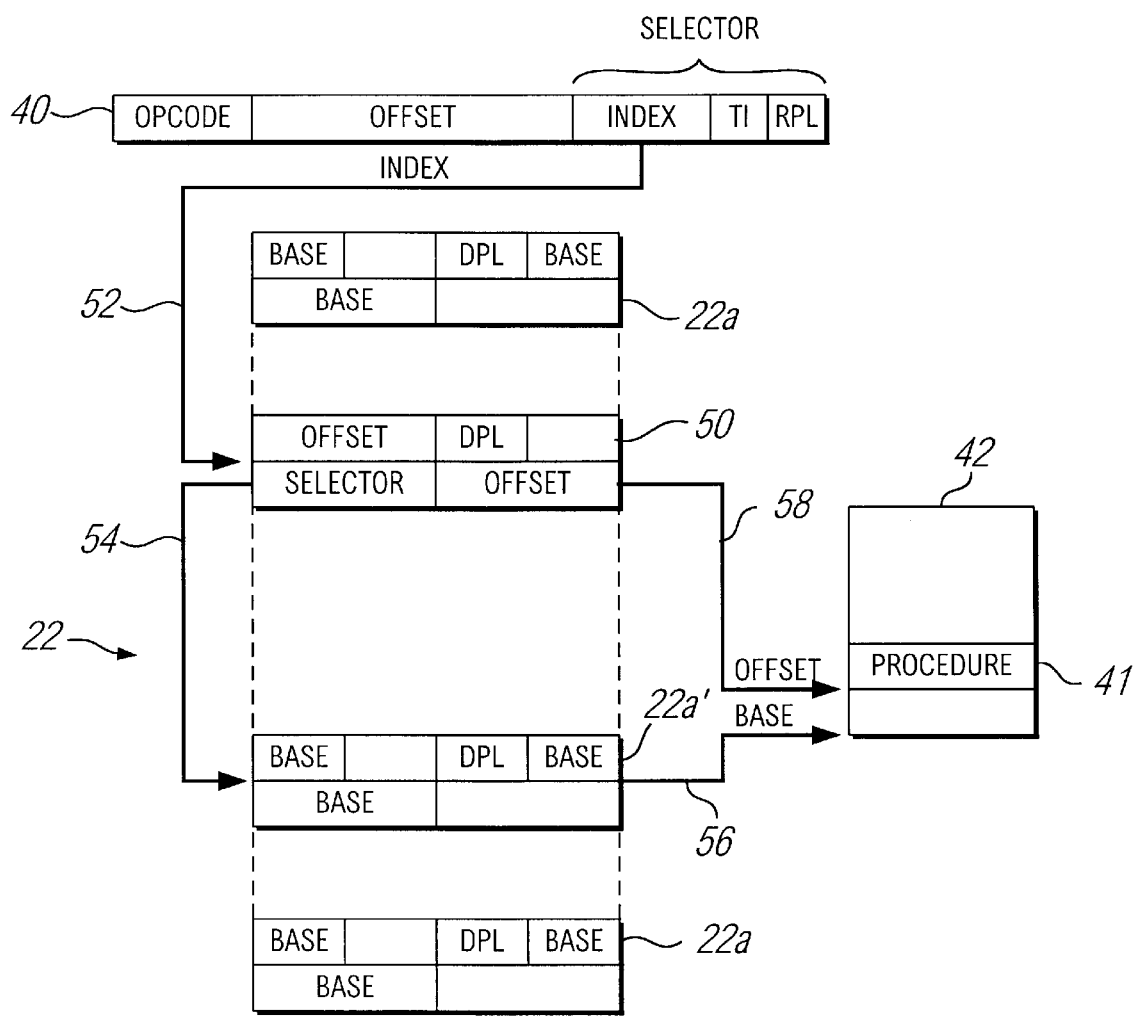
FIG. 4 is similar to FIG. 3, but illustrates a long call instruction being processed using a call gate.

However, in certain cases it is desirable to enable user level programs to access system functions via system calls. This is not possible using the arrangement of FIG. 3 because the user program would have a numerically higher privilege level than that required for system access. To overcome this limitation, system access for user programs is enabled using call gates as illustrated in FIG. 4, in which like elements are designated by the same reference numerals used in FIG. 3.

For access using a call gate, the offset in the instruction 40 is not used. Instead, access is obtained using the index alone, which points to a call gate 50 as indicated at 52 rather than to a segment descriptor 22a. In the present operating system the call gates are in the LDT 22, although it is also possible to provide call gates in the GDT.

The call gate 50 includes a segment selector which is similar to that in the instruction 40, and points to the segment descriptor 22a' for the desired segment 42 as indicated at 54. The segment descriptor 22a' includes the base address for the segment 42 as indicated at 56. The offset of the procedure 41 into the segment 42 is contained in the call gate 50 as indicated at 58.

Thus, the base address (indirectly) and the offset (directly) of the procedure in the segment 42 are both specified by the call gate 50. This prevents a user program from specifying an incorrect location in the segment 42. The DPL of the call gate 50 will generally be set to 3, enabling access by a user program. This scheme thereby enables a user program to access a system function or procedure via a system call.

In a standard Solaris or UNIX system, all system calls are directed to the core module 14 via a single call gate in the LDT for the process being executed. If a COFF program is being run, system calls which are not understood by or are otherwise incompatible with the core module 14 will be either be passed to the core module 14, or generate an exception or other error operation. This prevents a COFF program from running properly on a standard Solaris or UNIX operating system.

Figure 5:
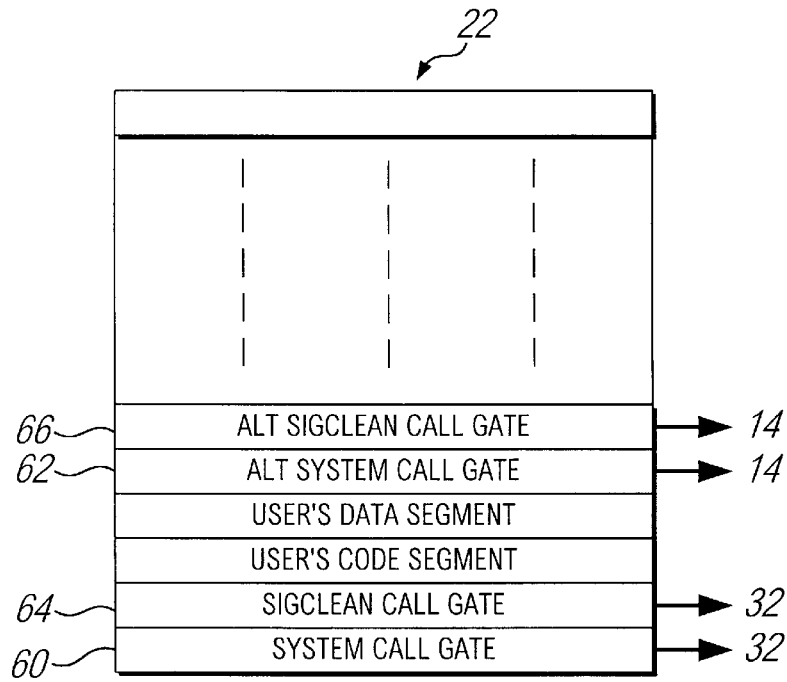
FIG. 5 is a diagram illustrating an LDT which is adapted in accordance with the present invention.

The present invention overcomes this problem by providing the COFF interpreter 32 and otherwise adapting the Solaris or other operating system as will be described in detail below. As illustrated in FIG. 5, the LDT 22 is modified to have two call gates for system calls, more specifically a main system call gate 60 and an alternate system call gate 62.

The LDT 22 can also include a main signal clean (SIGCLEAN) call gate 64 and an alternate signal clean call gate 66. The operation of the signal clean call gates 64 and 66 parallels that of the system call gates 60 and 62 and will not be described in detail.

The main call gate 60 corresponds to the single system call gate in a standard Solaris or UNIX system. The alternate call gate 62 provides the functionality to run a COFF program in conjunction with the COFF interpreter 32.

The call gates 60 and 62 normally both point to the standard entry point for system calls in the core module 14. Thus, when a COFF program is not being run, the system 10 is able to run current (compatible) programs in the normal manner by pointing to the kernel 14.

When a COFF 34 program is being set up to run, the call gate 60 is revectored to point to a system call entry point in the COFF interpreter 32. Accordingly, all system calls, regardless of whether they are current system calls that are compatible with the core module 14, or retrograde system calls that are unique to the COFF program 34, are directed through the call gate 60 to the entry point in the COFF interpreter 32.

Figure 6:
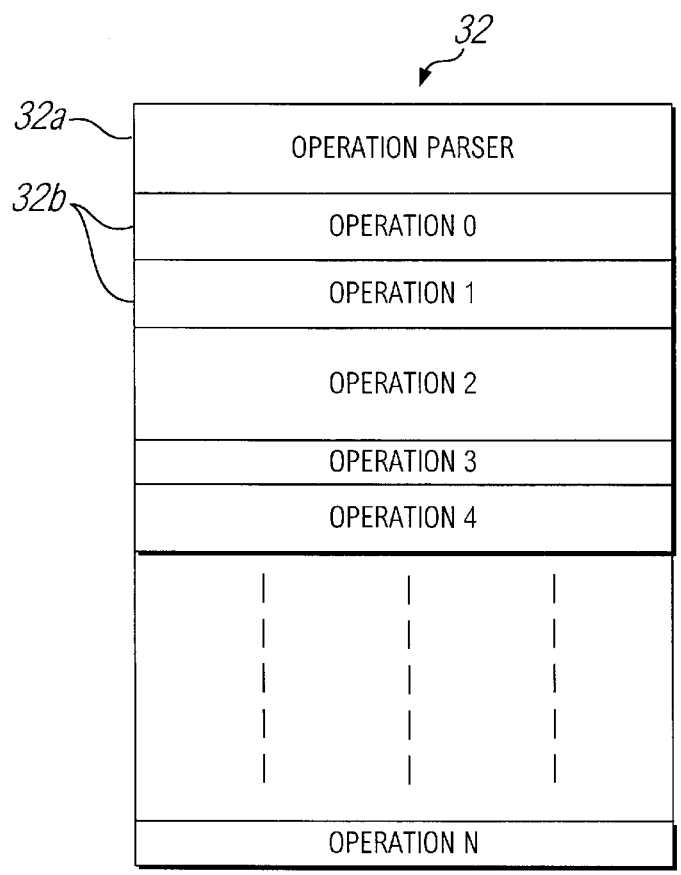
FIG. 6 is a diagram illustrating an emulator module of the present operating system.

As illustrated in FIG. 6, the COFF interpreter 32 includes an operation parser 32a which receives all system calls generated by the COFF program 34 at a system call entry point via the call gate 60. The COFF interpreter 32 further includes a plurality of operation modules 32b, one for each system call operation (as specified by the system call number of the instruction 40) that can be performed by the system 10.

The operation modules 32b are of two types: a first type for current system calls, and a second type for retrograde system calls. The operation parser 32a parses system calls received through the call gate 60, and directs the calls to the corresponding operation modules 32b. The first type of modules 52b redirect the current system calls to the core module 14 via the alternate system call gate 62. The second type of modules 52b include program code which emulates the operations specified by the system call numbers of the retrograde system calls. In this manner, current system calls are redirected to the core module 14 of the kernel 12, whereas retrograde system calls are emulated by the corresponding operation modules 52b of the COFF interpreter 32.

Although it is possible to use a different "libc" library 28 to redirect current system calls from the dynamic library 28 to the core module 14, and such is within the scope of the invention, it is preferable to change all system calls in the library 28 to point to the alternate call gate 62 and thereby to the core module 14 to minimize changes to the COFF interpreter 32.

Although not limitative of the scope of the present invention, the dynamic library 28 is changed to use the alternate system call gate for every process on the system 10. This includes the COFF interpreter 32, but also includes the regular ELF processes that will now use the alternate system call gate. This was done to simplify the COFF interpreter 32, and allow it to use the standard "libc" dynamic library 28. Libc used to use the main system call gate, prior to implementing the COFF support, and was changed to use the alternate system call gate after implementing the COFF support.

Hence, libc does not sometimes use the main system call gate, and at other times use the alternate system call gate depending on the process being run. The alternate system call gate is now preferably used in all instances.

The present operating system 10 can be provided on a variety of digital data storage media including, but not limited to, magnetic storage units such as floppy disks, optical storage units such as CD ROMs, volatile (RAM) or non-volatile (ROM) memory which is located in or separate from a digital computer, or any combination thereof.

The method by which the present operating system 10 implements the functionality described above will now be described. The method generally consists of the following steps.

1. Run the initialization module 16.
   a. The initialization table 18 includes a default template for an LDT. The initialization module 16 creates the two new call gates 62 and 66 in the LDT template for the alternate system and signal clean functions respectively.
   b. The auxiliary vector table 20 initially does not include room for the auxiliary vectors for passing execution parameters for the COFF program 34 to the COFF interpreter 32. The initialization module 16 creates room for two new auxiliary vectors in auxiliary vector table 20 for the entry point (starting address) of the program code in the COFF program 34, and a file descriptor for the COFF program 34 respectively.

2. The COFF execution module 24 is then run, which performs the following substeps.
   a. Load the COFF interpreter 32 via the ELF interpreter 26 (The COFF interpreter 32 is preferably implemented as an ELF program).
   b. Access the system 10 to get the entry point and file descriptor from the header of COFF program 34 and save them as the auxiliary vectors created in step 1(b).
   c. Pass the auxiliary vectors to COFF interpreter 32.
   d. Load the dynamic library 28 (including changing the system calls to point to the alternate call gates 62 and 66).

3. Branch to the core module 14 which sets up the LDT 22.

4. The COFF interpreter 32 is then run, which performs the following substeps.
   a. Use the system call support module 30 to revector the system call gates 60 and 64 to point to the system call entry point of the operation parser 32a in the COFF interpreter 32. A conventional system call support module disallows a user program from setting up or altering a call gate. The module 30 in the present operating system 10 is adapted to enable these operations to be performed.
   b. Branch to the COFF user program 34 via the auxiliary vectors that were passed to the COFF interpreter 32 in step 3(b).
   c. Use the operation parser 32a to parse system calls from the COFF user program 34.
   d. Emulate retrograde system call operations using the corresponding operation modules 32b.
   e. Direct current system call operations to the core module 14 of the kernel 12 via the alternate system call gate 62.

5. Run the COFF user program 34.
   a. Execute COFF program instructions other than system calls.
   b. Direct system calls to the operation parser 32a of the COFF interpreter 32 via the main system call gate 60.
   c. Exit to the core module 14 when the COFF program 34 has finished executing.

In summary, the present invention overcomes the drawbacks of the prior art and enables a current operating such as Solaris to run retrograde programs which were designed to run in the environment of a retrograde operating system such as an older version of UNIX without modification to the programs.

Various modifications will become possible for those skilled in the art after receiving the teachings of the present disclosure without departing from the scope thereof.

What is claimed is:

1. An electronic digital computer which is programmed with an operating system comprising:
    a main module configured to process current system calls;
    an emulator module configured to interpret a running retrograde program, the retrograde program being configured to generate current system calls and retrograde system calls, the emulator module being further configured to process the retrograde system calls;
    a main call gate to which current system calls and retrograde system calls generated by the retrograde program are directed, the main call gate pointing to the emulator module; and
    an alternate call gate which points to the main module;
    in which the emulator module is further configured to redirect current system calls to the alternate call gate.

2. An electronic digital computer as in claim 1, in which the retrograde program is a Common Object File Format (COFF) executable.

3. An electronic digital computer as in claim 1, in which the main call gate and the alternate call gate are entries in a descriptor table.

4. An electronic digital computer as in claim 1, in which:
    the main call gate initially points to the main module; and
    the emulator module is further configured to revector the main call gate to point to the emulator module prior to running a retrograde program.

5. An electronic digital computer as in claim 1, further comprising a retrograde program execution module configured to, prior to running a retrograde program, obtain execution parameters from the retrograde program, pass the execution parameters to the emulator module, run the retrograde program, and cause the emulator module to interpret system calls of the retrograde program.

6. An electronic digital computer as in claim 5, further comprising a dynamic library including current system calls, in which:
    the current system calls in the dynamic library point to the alternate call gate; and
    the execution module is further configured to load the dynamic library prior to running a retrograde program.

7. An electronic digital computer as in claim 6, in which the current system calls in the dynamic library are changed to point to the alternate call gate prior to running a retrograde program.

8. An electronic digital computer as in claim 1, in which:
    the main call gate initially points to the main module; and
    the system further comprises a system call support module which is adapted to allow the emulator module to revector the main call gate to point to the emulator module prior to running a retrograde program.

9. An electronic digital computer as in claim 1, in which the emulator module comprises:
    a plurality of operation processing modules configured to process current system calls and retrograde system calls in accordance with associated operations respectively; and
    an operation parser which is configured to parse and direct received current system calls and retrograde system calls to the operation processing modules in accordance with the associated operations respectively.

10. An electronic digital computer as in claim 9, in which operation processing modules for processing current system calls are configured to redirect the current system calls to the alternate call gate.

11. A computer operating system embodied in a computer-readable medium, the operating system comprising program code including:
    a main module configured to process current system calls;
    an emulator module configured to interpret a running retrograde program, the retrograde program being configured to generate current system calls and retrograde system calls, the emulator module being further configured to process the retrograde system calls;
    a main call gate to which current system calls and retrograde system calls generated by the retrograde program are directed, the main call gate pointing to the emulator module; and
    an alternate call gate which points to the main module;
    in which the emulator module is further configured to redirect current system calls to the alternate call gate.

12. A computer operating system embodied in a computer-readable medium of claim 11, in which the retrograde program is a Common Object File Format (COFF) executable.

13. A computer operating system embodied in a computer-readable medium of claim claim 11, in which the main call gate and the alternate call gate are entries in a descriptor table.

14. A computer operating system embodied in a computer-readable medium of claim 11, in which:
    the main call gate initially points to the main module; and
    the emulator module is further configured to revector the main call gate to point to the emulator module prior to running a retrograde program.

15. A computer operating system embodied in a computer-readable medium of claim 11, in which the program code further comprises a retrograde program execution module configured to, prior to running a retrograde program, obtain execution parameters from the retrograde program, load the emulator module, pass the execution parameters to the emulator module, run the retrograde program, and cause the emulator module to interpret system calls of the retrograde program.

16. A computer operating system embodied in a computer-readable medium of claim 15, in which:
    the program code further comprises a dynamic library including current system calls;
    the current system calls in the dynamic library point to the alternate call gate; and
    the execution module is further configured to load the dynamic library prior to running a retrograde program.

17. A computer operating system embodied in a computer-readable medium of claim 16, in which:
    the current system calls in the dynamic library are changed to point to the alternate call gate prior to running a retrograde program.

18. A computer operating system embodied in a computer-readable medium of claim 11, in which:
    the main call gate initially points to the main module; and
    the system further comprises a system call support module which is adapted to allow the emulator module to revector the main call gate to point to the emulator module prior to running a retrograde program.

19. A computer operating system embodied in a computer-readable medium of claim 11, in which the emulator module comprises:
   a plurality of operation processing modules configured to process current system calls and retrograde system calls in accordance with associated operations respectively; and
   an operation parser which is configured to parse and direct received current system calls and retrograde system calls to the operation processing modules in accordance with the associated operations respectively.

20. A computer operating system embodied in a computer-readable medium of claim 19, in which operation processing modules for processing current system calls are configured to redirect the current system calls to the alternate call gate.

21. A computer operating system embodied in a computer-readable medium of claim 11, in which the computer-readable medium comprises a magnetic storage unit for storing the operating system.

22. A computer operating system embodied in a computer-readable medium of claim 11, in which the computer-readable medium comprises an optical storage unit for storing the operating system.

23. A computer operating system embodied in a computer-readable medium of claim 11, in which the computer-readable medium comprises an electronic memory unit for storing the operating system.

24. A method for running a retrograde program on an electronic digital computer which is programmed with a current operating system, the operating system including a main module configured to process current system calls, an emulator module configured to interpret a running retrograde program which can generate current system calls and retrograde system calls, the emulator module being further configured to process the retrograde system calls, and a main call gate and an alternate call gate which both initially point to the main module, the emulator module being further configured to redirect current system calls to the alternate call gate, the method comprising the steps of:
   (a) loading the operating system into the digital computer;
   (b) revectoring the main call gate to point to the emulator module;
   (c) running the retrograde program; and
   (d) causing the emulator module to interpret system calls of the retrograde program.

25. A method as in claim 24, further comprising the steps, performed between steps (b) and (c), of:
   (e) obtaining execution parameters from the retrograde program; and
   (f) passing the execution parameters to the emulator module.

26. A method as in claim 24, further comprising the step, performed prior to step (c), of:
   (e) loading a dynamic library including current system calls that point to the alternate call gate.

* * * * *